Sept. 4, 1962 R. J. MISHLER 3,052,447
TIRE SPREADER
Filed March 9, 1960 2 Sheets-Sheet 1
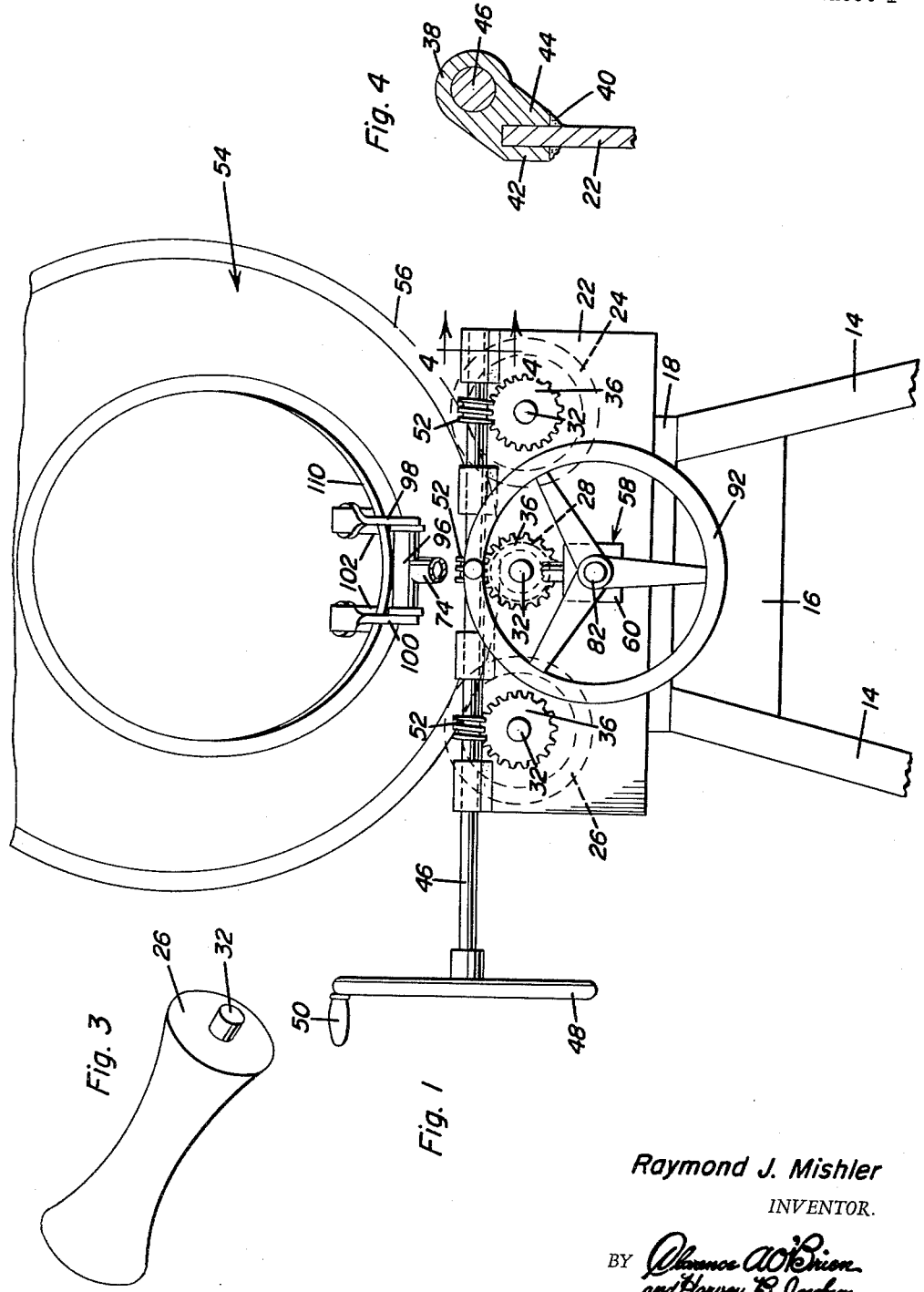
Raymond J. Mishler
INVENTOR.
BY Clarence A. O'Brien
and Harvey B. Jacobson
Attorneys

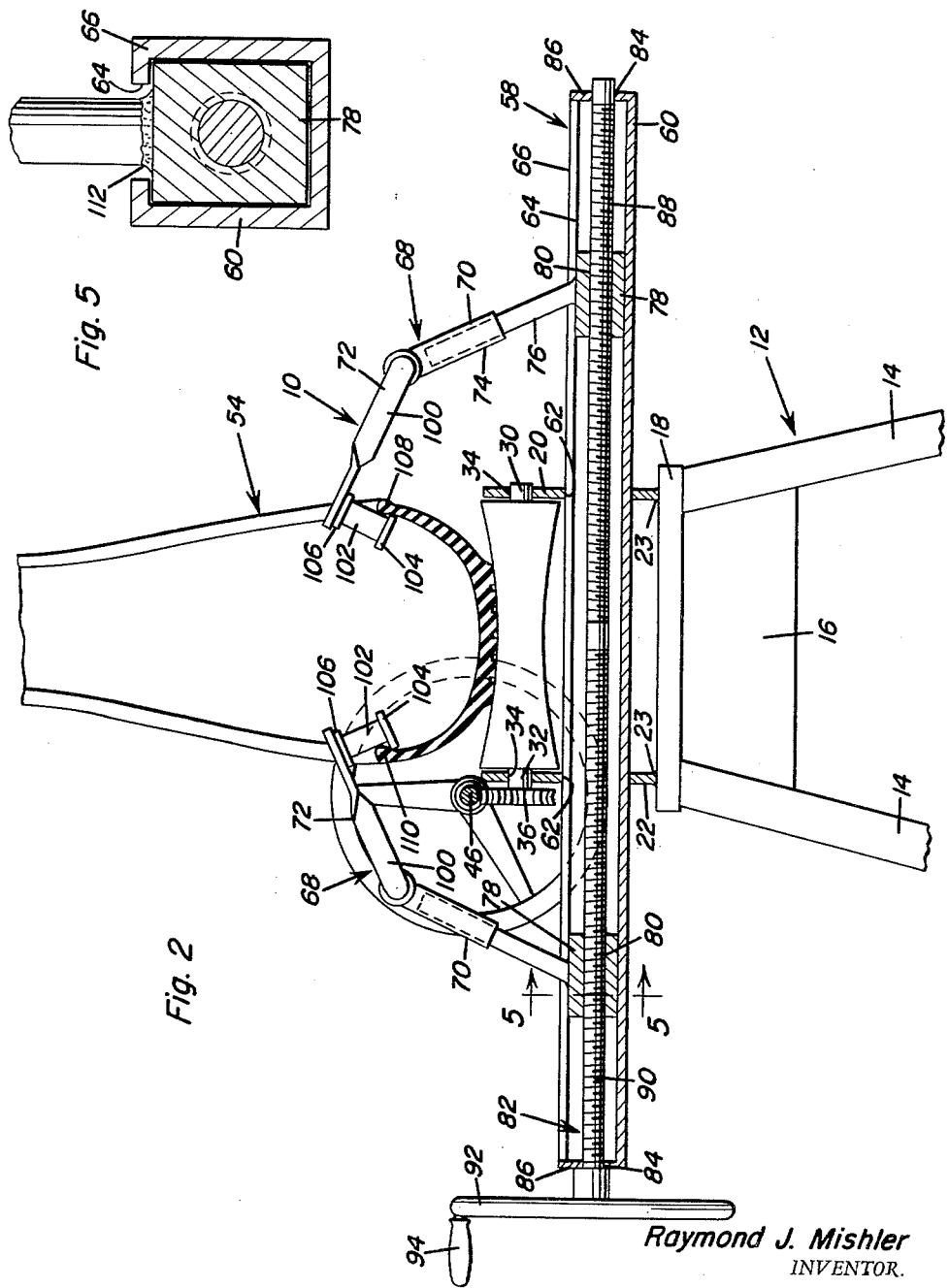

United States Patent Office 3,052,447
Patented Sept. 4, 1962

3,052,447
TIRE SPREADER
Raymond J. Mishler, % DX Service Station,
West Union, Iowa
Filed Mar. 9, 1960, Ser. No. 13,737
3 Claims. (Cl. 254—50.2)

This invention relates to a novel and useful tire spreader, and more particularly to a tire spreader which is specifically adapted to support a tire on its tread surface and spread the beads of the tire apart so that the internal surfaces thereof may be inspected. The tire spreader is also provided with means for rotating the tire about a horizontally disposed axis while maintaining the lower portions of the tire beads spread apart.

With the advent of tubeless tires and with the faster speeds at which motor vehicles of today are driven, it has become more important than ever to thoroughly inspect a tire casing each time it is repaired or dismantled from its rim to assure that the structure of the tire casing has not been weakened structurally in any manner that would cause a tire failure. The vehicles being manufactured today are increasing in weight with each new model that is produced and the tires of these heavier vehicles must be capable of absorbing greater shocks from holes and the like in road surfaces. The vehicle manufacturers have made numerous advances in the design of the wheels and tires with which their vehicles are equipped but a sudden tire failure at high speeds is still very dangerous.

It is therefore the main object of this invention to provide a tire spreader which will enable a garage attendant or the like to quickly and conveniently make a thorough inspection of each tire casing before it is mounted on a rim.

A further object of this invention, in accordance with the immediately preceding object, is to provide a tire spreader which will support a tire on its tread surface and spread the lower portions of the beads of the tire apart so that the inner surfaces of the tire casing may be easily inspected.

Yet another object of this invention, in accordance with the preceding objects, is to provide a tire spreader which will, while maintaining the lower portions of the tire beads spread apart, rotate the tire in either direction so that the entire internal surfaces of the tire casing may be inspected.

Still another object of this invention is to provide a tire spreader which will be readily adaptable in handling tire casings of varying sizes.

A final object to be specifically enumerated herein is to provide a device that will conform to conventional forms of manufacture, be of simple construction, and easy to operate so as to provide a device that will be economically feasible, long lasting and operable by substantially every service station attendant and the like.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the tire spreader shown with a tire casing being supported thereby, parts of the tire spreader being broken away and parts being shown in phantom lines to more clearly illustrate the details of construction;

FIGURE 2 is a transverse vertical sectional view of the tire spreader taken substantially upon a plane passing through the center of the tire spreader shown in FIGURE 1;

FIGURE 3 is a perspective view of one of the rollers of the tire spreader on somewhat of an enlarged scale;

FIGURE 4 is a fragmentary enlarged vertical sectional view taken substantially upon the plane indicated by the section line 4—4 of FIGURE 1; and FIGURE 5 is a vertical sectional view on somewhat of an enlarged scale taken substantially upon the plane indicated by the section line 5—5 of FIGURE 2.

Referring now more specifically to the drawings, the numeral 10 generally designates the tire spreader comprising the present invention which includes a table generally designated by the reference numeral 12. The table 12 has a plurality of support legs 14 which are suitably braced by gussets 16 and are interconnected at their upper ends by means of a top 18.

A pair of longitudinally extending, spaced, parallel and upstanding support flanges 20 and 22 are secured to the upper surface of the top 18 in any convenient manner such as by welding 23 and have rotatably journaled therebetween about horizontally aligned, transversely extending and parallel axes a plurality of rollers 24, 26 and 28. Each of the rollers 24, 26 and 28 is provided with a pair of stub axles 30 and 32 which are journaled in apertures 34 formed in the support flanges 20 and 22. Each of the stub axles 32 has a drive gear 36 secured thereto for a purpose to be hereinafter more fully set forth.

The upper edge of the support flange 22 has a plurality of bifurcated bearing journals 38 secured thereto by means of welding 40. The journal bearings 38 receive the upper edge portions of the support flange 22 between the furcations 42 and 44 thereof and each rotatably journals a portion of a driving shaft generally designated by the reference numeral 46. The driving shaft 46 has a crank wheel 48 having a handle 50 secured to one end thereof and a plurality of driving gears 52 are secured to the driving shaft 46 for rotation therewith and are engaged with the drive gears 36. Thus, it will be noted that upon rotation of the driving shaft 46 the rollers 24, 26 and 28 will be simultaneously rotated in the same direction.

A tire casing generally referred to by the reference numeral 54 is supported upon the rollers 24, 26 and 28 by means of its tread surface 56 and it is to be noted that the roller 28 is of a smaller diameter than the rollers 24 and 26 for reasons which are believed to be obvious from FIGURE 1 of the drawings.

A slide rack generally referred to by the reference numeral 58 which comprises a non-circular hollow housing 60 is secured through suitable openings 62 formed in the support flanges 20 and 22. The housing 60 is disposed in parallel relation to the rollers 24, 26 and 28 and is provided with a longitudinally extending slot 64 formed in the upper wall 66 thereof.

A pair of upstanding spreader arms each generally designated by the reference numeral 68 are provided and include lower portions 70 and upper articulated portions 72.

With particular attention directed now to FIGURES 1 and 2 of the drawings it will be noted that each lower portion 70 includes a pair of telescopingly engaged sections 74 and 76 and that the lowermost section 76 terminates in an enlarged slide block 78 at its lower end which is complementary to and is slidably received within the housing 60. The section 76 is slidably received through the slot 64 formed in the housing 60 and the enlarged slide blocks 78 are each provided with threaded bores 80. It is to be noted that one of the threaded bores 80 is provided with left handed threads and the other threaded bore 80 is provided with right handed threads. A screw shaft generally designated by the reference numeral 82 is journaled for rotation longitudinally of the housing 60 by means of apertures 84 formed in end plates 86. The screw shaft 82 is provided with oppositely threaded end portions 88 and 90 which are threadedly engaged with the threaded bores 80. The screw shaft 82 is provided with a crank wheel 92 having a handle 94 secured thereto for effecting rotation of the screw shaft 82 and simultaneous sliding movement of the slide blocks 78 to move the spreader arms 68 toward and away from the tire casing 54.

The upper end of the section 74 has a transversely extending journal tube 96 secured thereto which rotatably journals the corresponding end portion of the spaced arms 98 and 100 of the upper articulated portions 72. The free ends of each of the arms 98 and 100 are provided with suitable laterally projecting rollers 102 which are flanged as at 104 and 106. The rollers 102 are journaled for rotation about their longitudinal axes and are adapted to engage the inner surfaces of the lower portion of the beads 108 and 110 of the tire casing 54.

It will be noted that the lower portions 70 of the spreader arms 68 are upwardly inclined toward the tire casing 54. Further, see FIGURE 5 in particular, it will be noted that the slide blocks 78 are secured to the lower ends of the sections 76 in any convenient manner such as by welding 112.

In operation, the tire casing 54 is placed upon the rollers 24, 26 and 28. The screw shaft 82 may then be rotated to adjustably position the spreader arms 68 whose upper articulated portions 72 may then be pivoted to engage the rollers 102 with the beads 108 and 110 of the tire casing 54. The screw shaft 82 is then rotated to move the spreader arms 68 apart whereupon the beads 108 and 110 will be spread apart from each other. After the beads 108 and 110 have been spread apart the desired amount, the crank wheel 48 may be rotated to effect rotation of the rollers 24, 26 and 28 which will, in turn, impart rotation to the tire casing 54 whereupon the entire inner surface of the latter may be inspected by the person operating the tire spreader 10. It will be noted that the tire casing 54 may be rotated in either direction by merely reversing the rotation of the driving shaft 46.

If a tire casing 54 of a greater size is to be inspected, the lower portions 70 of the spreader arms 68 may be extended to raise the articulated portions 72 whereupon the approximate angular relationship of the articulated portions 72 of the spreader arms 68 relative to the housing 60 may be maintained. It is to be noted that the lower section 76 of the lower portions 70 of each spreader arm 68 in inclined slightly toward the rollers 24, 26 and 28 at its upper end and therefore the upper section 74 will not be as likely to change its position relative to the lower section 76. However, the angular relationship of the lower sections 76 is not great enough to enable relative movement of the sections 74 and 76 upon the moving of the spreader arms 68 apart to spread the beads 108 and 110 of the tire casing 54.

It is to be noted that since the roller 28 is of a smaller diameter than the rollers 24 and 26 a different gear ratio between the drive gear 36 secured to the roller 28 and the corresponding driving gear 52 may be effected if it is desired that the circumferential surfaces of the roller 28 move at the same speed as the corresponding surfaces of the rollers 24 and 26 upon rotation of the driving shaft 46.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A tire spreader including a table, a plurality of rollers, means on said table journalling said rollers for rotation in spaced, parallel and side-by-side relation for supporting the tread surface of a tire extending thereacross, a pair of upstanding spreader arms, means mounting the lower ends of said spreader arms on opposite sides of said table for movement toward and away from each other and a tire supported by said rollers, the upper end portions of said arms being articulated for swinging movement toward and away from said tire and having on their free ends means adapted for engagement with the inside of the lowermost portion of the beads of said tire for spreading the same apart upon movement of said arms away from each other, means for adjusting the spacing of said arms from the mid-portions of said rollers, the lower portions of said arms being extensible and fixed in angular relation relative to each other, a drive gear secured to one end of each of said rollers, a driving shaft, means on said table journalling said driving shaft for rotation about an axis extending transversely of said rollers and aligned with said drive gears, driving gears secured to said driving shaft each engaged with one of said drive gears for effecting its rotation upon rotation of said driving shaft, said mounting means comprising a slide rack disposed parallel with and beneath said rollers, means on the lower ends of said arms slidably engaged with said rack for movement therealong, said rack including a hollow non-circular housing, a longitudinally extending slot formed in the upper surface of said housing, the lower ends of each of said arms passing through said slot and terminating in enlarged slide blocks snugly and slidably disposed in said housing for reciprocal movement therealong, aligned bores formed in said blocks, said bores being provided with right and left handed threads, said adjusting means comprising a screw shaft journalled for rotation in said housing having its opposite end portions provided with right and left handed threads, said end portions engaged with said threaded bores.

2. The combination of claim 1, wherein said rollers are three in number, the roller disposed between the end rollers being slightly smaller in diameter.

3. The combination of claim 1 wherein said lower portions of said arms are upwardly convergent.

References Cited in the file of this patent

UNITED STATES PATENTS

| | | |
|---|---|---|
| 1,371,480 | Harkins | Mar. 15, 1921 |
| 1,685,038 | Teich | Sept. 18, 1928 |
| 1,863,764 | Prentice | June 21, 1932 |
| 2,173,795 | Fisher | Sept. 19, 1939 |
| 2,347,311 | Branick | Apr. 25, 1944 |